United States Patent Office 3,053,043
Patented Sept. 11, 1962

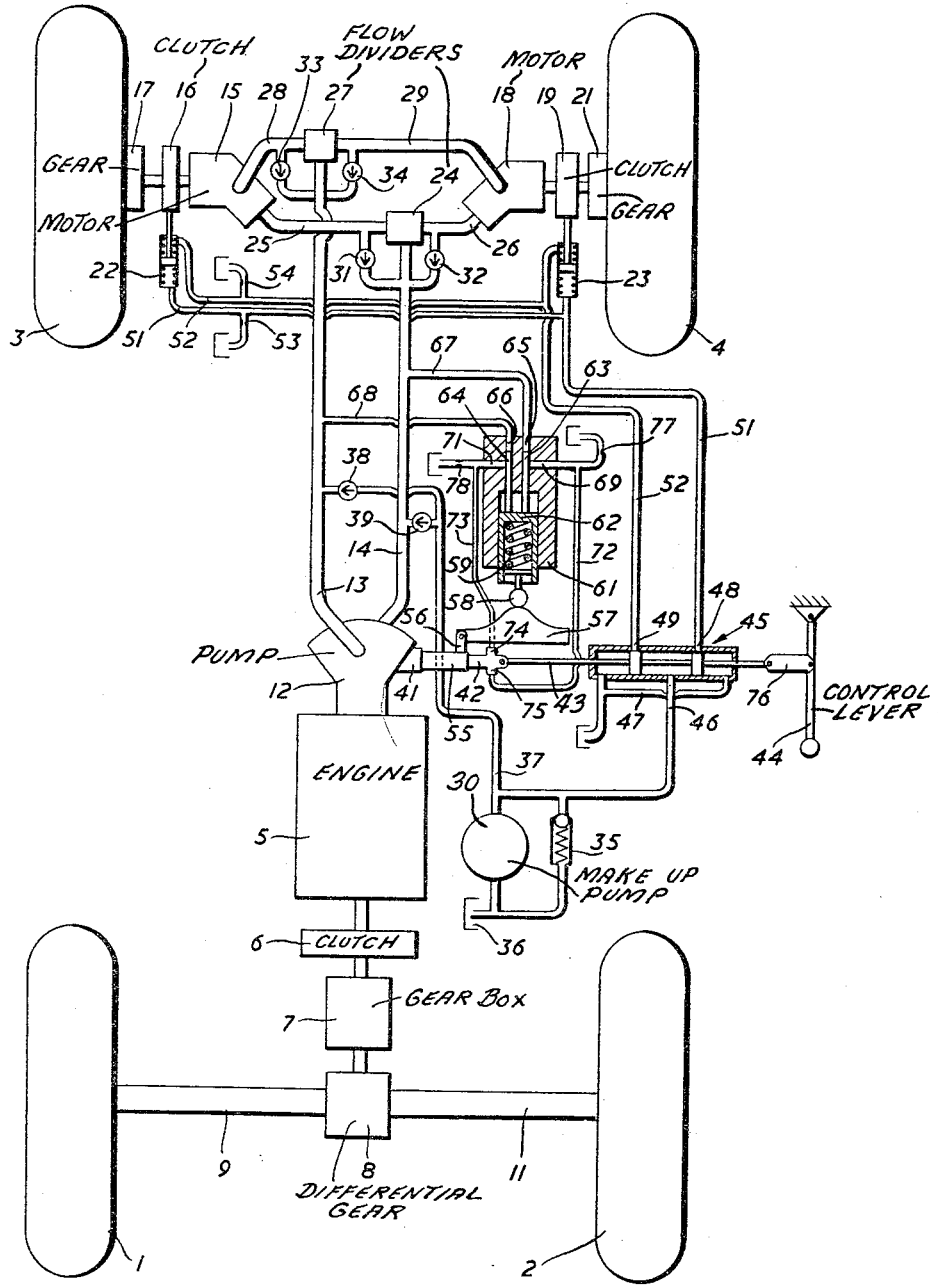

3,053,043
HYDRAULIC APPARATUS
Peter Knowler, Wolverhampton, England, assignor to Dowty Hydraulic Units Limited, Tewkesbury, England, a British company
Filed Oct. 11, 1960, Ser. No. 62,036
Claims priority, application Great Britain Oct. 12, 1959
7 Claims. (Cl. 60—6)

This invention relates to hydraulic apparatus and, more particularly, although not exclusively, to hydrostatic power transmission for the propulsion of vehicles. On many vehicles an efficient transmission of any of the known types is provided to transmit power from the engine to one or more of the wheels or other ground engaging elements, leaving one or more idling ground engaging elements to act merely to support part of the weight of the vehicle and permit a substantially friction free vehicle movement. For convenience, the ground engaging elements will be referred to as wheels. Some vehicles, during use, often face the difficulty that the wheels have not sufficient adhesion with the ground to drive the vehicle. For example, an earth scraping vehicle is normally driven by the front wheels, the rear wheels being idlers, and during a scraping operation it is often found that the adhesion of the front wheels is not sufficient and some external assistance needs to be given to the scraper, possibly by way of pushing by means of a crawler tractor to enable it to carry out its scraping operation. Another example is an earth transporting vehicle which needs to climb steep gradients. Where only one pair of wheels is driven from the engine, it is often found that on climbing steep gradients there is insufficient wheel adhesion or, alternatively, the engine, when lowest gear is engaged, is incapable of rotating the wheels. Similar difficulties also arise with articulated vehicles having front wheel drive only. A further example is a vehicle intended for travelling, on occasions, over soft ground. If the drive is only to one pair of wheels then it is often found that where the ground tends to be rather soft an insufficient propulsive force can be applied to keep the vehicle moving.

The main object of the present invention is to provide an auxiliary drive which is of particular use for driving the normally idle wheels of vehicles to increase the propulsive force applicable to a vehicle. It is also intended that the auxiliary drive of the invention should be applicable to other uses where it is necessary to engage with a moving load.

In accordance with the present invention, an auxiliary infinitely variable speed rotary power transmission for transmitting power from a power source to a moving load includes unidirectional means to transmit power to the load, a manually controlled speed ratio selecting means for the transmission, and overriding speed ratio reducing means responsive to excessive torque exerted by the power source on the transmission to reduce the selected speed ratio automatically to prevent the said torque being exceeded if an excessive speed ratio is manually selected. By the use of this invention, if a zero speed ratio is selected, no power will be transmitted to the load and the unidirectional means will act to prevent power being absorbed by the transmission from the load. In the event that it is necessary to bring the auxiliary transmission into action, the speed ratio is increased manually until the transmission drives at the speed of the load and the unidirectional means can act to transmit power to the load. In the event that excessive speed ratio is selected, automatic means act to reduce the selected speed ratio to prevent a predetermined driving torque from being exceeded from the power source into the transmission. The auxiliary infinitely variable transmission may comprise a variable positive displacement hydraulic pump driven by the power source and a positive displacement hydraulic motor hydraulically connected with the pump and mechanically connected through the unidirectional means to the load. The unidirectional means may comprise a simple unidirectional clutch or free wheel located between the hydraulic motor and the load. Alternatively, the unidirectional means may comprise a check valve connected across the hydraulic motor so that when the auxiliary transmission does not transmit power, hydraulic liquid can circulate freely through the check valve following rotation of the motor, but when the auxiliary transmission transmits power the check valve is closed by the pressure of hydraulic liquid delivered from the transmission pump, so that the hydraulic pump output passes entirely through the motor. When the invention is applied to an engine driven vehicle, the hydraulic motor of the transmission is preferably associated with an idling ground wheel and when brought into operation will act to develop an extra propelling force for the vehicle. In such a case the transmission is driven from the engine which normally drives the vehicle through a main constantly operating transmission. Normally the auxiliary transmission would only be brought into operation on the occasions where a high propulsive force is required for the vehicle and, under such circumstances, it is normal that the engine drives some ground engaging wheels through the main transmission operating at a low speed ratio. In this case the engine is capable of a substantial amount of excess power that is not transmitted through the main transmission and at least some of the excess power may be absorbed through the auxiliary transmission producing a useful extra propulsive force for the vehicle. Where the vehicle is intended for operation, either in a forward or reverse direction, it is necessary to provide that the unidirectional means can be changed to operate in either forward or reverse direction and that the transmission itself is capable of operating in both directions. In all cases the unidirectional means must be adapted to transmit torque in one direction only, either forward or reverse, depending on which is selected, and must not be capable of simultaneous counterdirectional application of torque.

One example of the invention as applied to an earth scraping vehicle will be described with reference to the accompanying diagrammatic drawing.

The earth scraping vehicle includes a pair of front ground engaging wheels, 1 and 2, and a pair of rear ground engaging wheels, 3 and 4. The front wheels 1 and 2 are mounted on a front component of the scraper vehicle on which is mounted an engine 5, clutch 6, gear box 7, differential gear 8 and drive shafts 9 and 11 carrying driving power to the wheels 1 and 2 respectively. The clutch 6, gear box 7 and differential gear 8 are arranged in a conventional manner. The rear component of the scraper vehicle has the ground engaging wheels 3 and 4 secured to it, and these wheels are normally idlers. The rear component also carries the ground scraping blades and bowl and a ginder device which extends to the front component and is connected thereto through a hinged joint which permits relative movement between the front and rear components about a vertical axis. The two components may be adjusted about the vertical axis relatively to one another to effect steering of the vehicle. With such a vehicle it is normally not possible to provide a mechanical drive to the wheels 3 and 4 of the rear component from the engine carried by the front component because the ony effective connection between the two parts of the vehicle is the hinged joint.

In applying the invention to such a vehicle, a variable reversible positive displacement hydraulic pump 12 is connected to the engine 5 to receive a driving torque. A pair of large diameter pipelines, 13 and 14 extend from the pump 12 to the rear wheels 3 and 4 in the rear component. The hinge pin between the two components may be specially arranged as a rotary connector to carry the hydraulic liquid in the pipelines 13 or 14 or, alternatively, flexible pipes may be provided in the neighbourhood of the hinge pin. In the rear component for driving the wheel 3 a hydraulic motor 15, unidirectional clutch 16 and reduction gear 17 are provided, whilst for driving the wheel 4 a hydraulic motor 18, unidirectional clutch 19 and reduction gear 21 are provided. The unidirectional clutches 16 and 19 are of a well-known type capable of reversible operation, the operation being determined by piston and cylinder units 22 and 23 respectively. These units include spring loading which, when hydraulic pressure is not applied, normally act to centre the units into the position where the unidirectional clutches are not engaged and there is no connection whatsoever between the motors 15 and 18 and their respective wheels. The pipe 14 extending from the pump 12 connects to a flow divider 24, which acts to divide the flow from pipe 14 substantially equally into two pipes 25 and 26, extending respectively to the motors 15 and 18. Similarly the pipe 13 connects to a flow divider 27 dividing the flow from pipe 13 substantially equally into pipes 28 and 29, which feed respectively to motors 15 and 18. These flow dividers 24 and 27 may be of the type disclosed in our U.S. Patent No. 2,985,184 issued May 23, 1961. At any instant only one flow divider will operate to carry flow from the pump to the motor and the other flow divider will be located in pipes carrying return flow to the pump. Since flow dividers of the kind referred to do not permit return flow, there is provided for each of the pipes 25, 26, 28 and 29 check valves, respectively 31, 32, 33 and 34 to bypass the associated flow divider into the main line extending to the pump to accommodate return flow.

For the purpose of maintaining the transmission primed with liquid, a make-up pump 30 is provided which may simply comprise a small gear pump driven by the engine 5. A pressure relief valve 35 is connected across the pump. The pump draws its liquid from reservoir 36 and delivers it at substantially constant pressure to pipe 37. From the pipe 37 a pair of check valves, respectively 38 and 39, extend to the pipelines 13 and 14, whereby liquid at the relatively low pressure in the pipe 37 can enter the pipe 13 or 14 which is carrying return flow at low pressure. The pipe carrying delivery from the pump 12 will be at high pressure and will hold the check valve 38 or 39 closed.

For the purpose of adjusting the displacement of the pump 12 and accordingly the speed ratio of the transmission, a servo-motor 41 is provided acting within pump 12 to vary the pump displacement. This servo-motor 41 is of the kind disclosed in our co-pending U.S. patent application No. 41,296, filed July 7, 1960. Control of the servo-motor is effected by a sliding member 42 which is actuated by a rod 43 extending from a hand control lever 44. The rod 43 has located thereon a piston valve unit 45 which receives a pressure connection 46 from the pipe 37. A reservoir connection 47 is also provided. The piston valve unit is of a conventional kind and co-operates with a pair of ports 48 and 49 from which pipes 51 and 52 extend both to the piston and cylinder units 22 and 23. The arrangement of the valve 45 is that in the central position of lever 44 corresponding to zero displacement of pump 12 both the ports 48 and 49 are closed. When the lever 44 is moved to select forward displacement of the pump 12, the pressure from pipe 37 is connected to port 49 and from there passes through pipe 52 to the inner ends of both piston and cylinder units 22 and 23, causing outward movement which controls the unidirectional clutches 16 and 19 to operate in the forward direction. Similarly, when the lever 44 is moved to the reverse position pressure is connected to the port 48 and from there flows via pipe 51 to the outer ends of the piston and cylinder units 22 and 23, causing inward movement which adjusts the unidirectional clutches 16 and 19 for operation in the reverse direction. When either of the ports 48 or 49 are connected to pressure, then the other port is connected to reservoir by the action of the valve 45. To ensure that when lever 44 is in the neutral position and no pressure is locked within the piston and cylinder units 22 and 23, a pair of restrictors 53 and 54 are provided, extending from pipes 51 and 52 respectively, and connected to reservoir. The pipes 51 and 52 which, of necessity, must pass from the front component to the rear component of the vehicle, are arranged to include flexible portions located adjacent to the hinge connection between the components of the vehicle.

A slidable member 55 of the servo-motor 41 projects from the pump 12, and within the pump 12 this member is directly connected for adjustment of pump displacement. Member 42 has a small amount of lost motion relative to member 45 to effect operation of valves within the servo-motor causing movement of member 55. A lug 56 connected to the external portion of the member 55 is connected to move a cam 57 in accordance with adjustment of pump displacement. The cam 57 co-operates with a follower 58 which adjustably loads a spring 59 carried by a valve unit 61. The spring is carried by a plunger 62 within the valve unit and from the end of the plunger opposite to the follower a pair of small diameter pistons, 63 and 64, are arranged to act endwise on the plunger 59, the plungers 63 and 64 slide in cylinders, respectively 65 and 66, which are respectively connected to pipes 67 and 68, extending from the pipelines 13 and 14. A pair of ports 69 and 71 extend one from each of the cylinders 63 and 64 and are adapted to be opened by the pistons 63 and 64 when one or other piston depresses the plunger 62 sufficiently against the loading of spring 59. From the ports 69 and 71, pipes 72 and 73 extend to connectors 74 and 75 carried by the moving member 42 of servo-motor 41. As explained in the said co-pending U.S. patent application No. 41,296 filed July 7, 1960, these connectors extend internally of the servo-motor to an override device which operates on receipt of pressure to cause overriding operation of the servo-motor to reduce the displacement selected by means of the hand control lever 44. A caged spring unit 76 in the control rod 43 permits this overriding reduction movement without necessarily causing movement of the lever 44. The pipes 72 and 73 are both connected back to reservoir by means of restrictors 77 and 78, so that the override device within servo 41 may return to a non-controlling position under spring action when the overriding displacement reduction has been completed.

In the normal operation of the scraper vehicle as described, the driver will normally drive the vehicle by conventional operation of clutch 6 and gear box 7, the drive being transmitted through the front wheels 1 and 2. During such normal driving, the control lever 44 is retained in the neutral position where zero displacement is selected by the pump 12. Thus, although the pump 12 is driven, it displaces no liquid through pipes 13 and 14. In the event that the driver requires extra propulsive effort; for example, during a scraping operation, he will have engaged low gear by means of gear box 7. To obtain the extra propulsive effort, the lever 44 is moved by the driver to the forward position. This movement will immediately connect low pressure from pipe 37 to the pipe 52 and cause the two piston cylinder units 22 and 23 to retract and thereby adjust the unidirectional clutches 16 and 19 for forward movement only of the wheels 3 and 4 relative to the motors 15 and 18. The movement of the rod 43 will also cause forward displacement of the pump 12 and the pumped liquid will pass through the pipe 13 to flow divider 27. The flow is then substantially equally divided between the pipes 28 and 29 to pass to the motors 15 and 18 to rotate them in the forward direction. Return flow from the motors passes through pipes 25 and 26 and check valves 31 and 32 into the pipeline 14 and back to the pump 12. As the driver increases selected displacement, the speed of the motors 15 and 18 will increase until the motors are rotating at the equivalent of the speed of the wheels 3 and 4, at which stage the unidirectional clutches 16 and 19 will engage and any further tendency of the motors 15 and 18 to increase their speed will cause driving torque to be transmitted to the wheels 3 and 4. If the driver then moves the lever 44 in the forward direction more than is necessary to transmit drive to the wheels 3 and 4, the pressure will rise in the pipe 13 of pump 12 and cause depression within valve unit 61 of the piston 64 against the loading of spring 59. The loading will have been adjusted by movement of the cam 57 following alteration in displacement of the pump. In particular, it will be seen that with increased displacement the loading of the spring 59 will be reduced. When the piston 64 is depressed to an extent to open the port 71, pressure liquid is admitted to connection 74 of servo-motor 41 and overriding action will take place to reduce the selected displacement to the extent that the piston 64 just closes the port 71. During this movement the caged spring 76 will prevent excessive force being exerted on the lever 44 tending to return it towards the neutral position. The cam 57 is shaped and the spring 59 is selected and arranged as regards its preloading and its rate to ensure that the product of the selected displacement and the pressure in pipe 13 or 14 at the instant of opening of port 71 or 69 remains constant. In this way it is ensured that the engine will not exert more than a given torque on the pump 12. It will thus be seen that it can be arranged that a proportion only of the power of the engine 5 need be diverted through the hydrostatic transmission to the rear wheels 3 and 4. Since the low gear in gear box 7 is engaged, the condition exists that a proportion only of the engine power is necessary to drive wheels 1 and 2 to the extent where they approach the limit of the adhesion with the ground and surplus power is therefore available to drive the rear wheels through the hydrostatic transmission. The action of the overriding displacement reducing control ensures that driving speed of the rear wheels 3 and 4 coincides with the speed of vehicle movement and that all wheels effectively can make a substantial contribution to propulsion of the scraper. The action of the overriding displacement reducing control is disclosed in our U.S. Patent 2,896,411.

In the event that extra propulsion effort is required in reverse movement, the driver will, of course, engage reverse gear in gear box 7 to propel the vehicle rearwardly and will move lever 44 in the reverse direction which, in turn, will cause pump delivery to take place through pipe 14 to flow divider 24 and to the two motors 15 and 18 causing them to rotate in the reverse direction. Also, movement of lever 44 will have connected pipe 51 to receive low pressure from pipe 37, thus moving the piston and cylinder units 22 and 23 outwardly to engage the reverse unidirectional clutches in the units 16 and 19. By moving the lever 44 to increase displacement, the speeds of the motors 15 and 18 will be raised until such time as they drive the wheels 3 and 4. As the displacement selecting lever 44 is moved further, pressure will rise in the pipe 14 causing movement of piston 63 against the loading of spring 59 to open the port 69, thus causing the servo-motor 41 to reduce the selected displacement.

Whilst the invention has been described as applied to a scraper vehicle, it will be appreciated that it has many other applications, not necessarily applied to providing auxiliary drives to normally idling wheels of vehicles. The invention might equally well be applied, for example, in the hoisting machinery of cranes to enable extra heavy loads to be lifted or, again, in the drive to rolling mills, to assist in dealing with extra heavy loads. The invention is not confined to the case where one engine provides the power for the main transmission and for the auxiliary transmission, and it is within the scope of the invention that separate power sources might be used for the main and auxiliary transmission.

I claim as my invention:

1. In combination with a pair of ouput means for applying force against a common load to cause relative movement therebetween, power producing means, means for translating power from said power producing means into rotary torque applied to one of said output means, and variable speed power transmission means driven by said power producing means and including unidirectional clutch means operably engageable with the other output means to transmit rotary torque thereto, apparatus operable to select a speed ratio for said variable speed power transmission means, said apparatus including overrider means for automatically reducing the selected speed ratio in response to increase of the torque applied to said other output means above a predetermined value commensurate with the relative speed of movement of said load.

2. The combination according to claim 1 further comprising means for actuating the clutch means.

3. The combination according to claim 1 wherein said variable speed power transmission means includes a variable positive displacement hydraulic pump driven by said power producing means and a positive displacement hydraulic motor hydraulically connected with the pump, said clutch means being connected with said motor.

4. The combination according to claim 1 wherein said variable speed power transmission means includes a variable positive displacement hydraulic pump having an outlet hydraulically connected with said clutch, and said overrider means for automatically reducing the selected speed ratio includes pressure sensitive means operably connecting the pump outlet and said speed ratio selecting apparatus.

5. The combination according to claim 2 further comprising manually operated means for activating said clutch actuating means and said speed ratio selecting means.

6. In combination with output means for applying force against a moving load, power producing means, and variable speed power transmission means driven by said power producing means and including unidirectional clutch means operably engageable with the output means to transmit rotary torque thereto, apparatus operable to select a speed ratio for said variable speed power transmission means, said apparatus including overrider means for automatically reducing the selected speed ratio in response to increase of the torque applied to said output means above a predetermined value commensurate with the speed of movement of said load.

7. The combination according to claim 6 further comprising manually operated means for actuating the clutch means and the speed ratio selecting means.

References Cited in the file of this patent

UNITED STATES PATENTS 2,896,411    Bowers et al. _____ July 28, 1959

FOREIGN PATENTS 241,234    Great Britain _____ 1927
791,903    Great Britain _____ Mar. 12, 1958